US012149544B2

United States Patent
Barnett, Jr. et al.

(10) Patent No.: US 12,149,544 B2
(45) Date of Patent: Nov. 19, 2024

(54) EDGE-BASED POLYMORPHIC NETWORK WITH ADVANCED AGENTLESS SECURITY (71) Applicant: CenturyLink Intellectual Property LLC, Broomfield, CO (US)

(72) Inventors: Thomas Charles Barnett, Jr., Monroe, LA (US); Ronald Anthony Lewis, Montgomery, AL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 259 days.

(21) Appl. No.: 17/808,684

(22) Filed: Jun. 24, 2022

(65) Prior Publication Data

US 2022/0417269 A1 Dec. 29, 2022

Related U.S. Application Data (60) Provisional application No. 63/215,363, filed on Jun. 25, 2021.

(51) Int. Cl.
*H04L 9/40* (2022.01)
(52) U.S. Cl.
CPC ............................... *H04L 63/1416* (2013.01)
(58) Field of Classification Search
CPC ........................... H04L 63/1416; G06F 21/602
USPC .......................................................... 726/25
See application file for complete search history.

(56) References Cited

U.S. PATENT DOCUMENTS

| | | | |
|---|---|---|---|
| 2017/0104609 A1* | 4/2017 | Mcnamee | H04W 4/24 |
| 2017/0257276 A1* | 9/2017 | Chou | H04L 41/0823 |
| 2018/0267846 A1 | 9/2018 | Dobbs | |
| 2019/0014056 A1* | 1/2019 | Sharma | H04L 47/762 |
| 2021/0160310 A1* | 5/2021 | Azizullah | H04L 67/1027 |
| 2021/0297442 A1* | 9/2021 | Vasseur | H04L 63/1441 |
| 2022/0132358 A1* | 4/2022 | Peng | H04W 28/0268 |
| 2022/0188028 A1* | 6/2022 | Mesnier | G06F 3/067 |

OTHER PUBLICATIONS

Nie, Yu (Marco), "A Polymorphic Dynamic Network Loading Model", *Computer-Aided Civil and Infrastructure Engineering* vol. 23, Issue 2 2008, pp. 86-103.
Utter, Alexander et al., "SatCat5: A low-power, mixed-media Ethernet network for smallsats", 34th Annual Small Satellite Conference; SSC20-XXII-06 2020, pp. 1-13.

* cited by examiner

*Primary Examiner* — Tan Doan (57) ABSTRACT

Aspects of the present application comprise an edge-based polymorphic network and associated agentless security solutions. Present systems and methods may effectively shape-shift the network through network topology management, node templates, link templates, and network packet manipulation. Using agentless techniques, the network may be reshaped when attacks are detected in a manner that impacts only the attacker, and an agentless color theory security solution may be used to dynamically protect network traffic.

12 Claims, 6 Drawing Sheets

EDGE-BASED POLYMORPHIC NETWORK WITH ADVANCED AGENTLESS SECURITY

CROSS-REFERENCE TO RELATED APPLICATIONS

This application claims the benefit of U.S. Provisional Application No. 63/215,363 filed Jun. 25, 2021, entitled "Edge-Based Polymorphic Network with Advanced Agentless Security," which is incorporated herein by reference in its entirety.

BACKGROUND

With the current challenges of terrestrial and wireless connectivity and the reality of cyber and electronic warfare (EW) threats, existing tactical and enterprise network solutions are not well-suited for mobile and dynamic edge environments. As a result, cloud and client/server applications, supporting networks, and wireless devices are difficult to set up, manage and maintain. It is with respect to this general technical environment that aspects of the present application are directed.

SUMMARY

Aspects of the present disclosure relate to a method for dynamically instantiating a network function on a network. The method may comprise receiving, at a first network node, data packets, wherein the first network node comprises a neuromorphic processor; determining, by the first network node, that the data packets include at least first and second characteristics; determining, based on the first and second characteristics that an additional network function is needed; loading, by the neuromorphic processor, a node model for the additional network function; instantiating the additional network function on the neuromorphic processor based on the node model; processing the data packets based using the additional network function; and automatically destroying the additional network function on the neuromorphic processor upon detection of a trigger.

Other aspects of the present disclosure may comprise a system for dynamically instantiating a network function on a network. The system may comprise a first network node that includes: a neuromorphic processor; and memory, operatively connected to the neuromorphic processor and containing instructions that, when executed by the neuromorphic processor, cause the first network node to perform a method. In examples, the method comprises: receiving, at a first network node, data packets, wherein the first network node comprises a neuromorphic processor; determining, by the first network node, that the data packets include at least first and second characteristics; determining, based on the first and second characteristics that an additional network function is needed; loading, by the neuromorphic processor, a node model for the additional network function; instantiating the additional network function on the neuromorphic processor based on the node model; processing the data packets based using the additional network function; and automatically destroying the additional network function on the neuromorphic processor upon detection of a trigger.

Other aspects comprise a method for providing packet security. In examples, the method comprises: receiving, at a first network node, a data packet comprising a payload; determining, by the first network node, a first path and a second path for the data packet, wherein the first path includes at least a second network node and the second path includes a third network node; determining a network cost for the first path and a network cost for the second path; determining, by the first network node, a sensitivity for the payload; determining, by the first network node, a risk score for the second network node and a risk score for the third network node; determining, based on the sensitivity for the payload, the risk scores for the second network node and the third node, and the network costs for the first path and the second path, whether to forward the packet along the first path or the second path; based on determining to forward the packet along the first path, dynamically generating an encryption mechanism on the first network node; and encrypting the payload prior to sending the packet to the second network node.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Aspects of the present application comprise an edge-based polymorphic network and associated agentless security solutions. The approach includes a wide area network (WAN) and local area network (LAN) interfaces that effectively shapeshift the network through network topology management, node templates, link templates, and network packet manipulation. Using agentless techniques, the proposed solution "reshapes" the network when attacks are detected in a manner that impacts only the attacker. The security aspects of the network also leverage an agentless color theory security solution.

Aspects include support of fully networked command, control, and communications (FNC3) guiding principles:

everything is a node on the network (polymorphic network), a more flexible, diverse, and interoperable system (edge technology), and software-defined solutions.

Aspects also utilize a co-processing node to manage attackers and network topologies. For example, a neuromorphic processor that has multiple different processing capabilities can be used, and the processing elements (PEs) of the neuromorphic processor can be continually allocated and reallocated to different functions depending the then-current needs of the node.

In aspects, the present technology utilizes the power of neuromorphic computing to manage a communication network to thwart attacks and intelligently route and protect data in a manner appropriate for its sensitivity. Neuromorphic computing elements may effectively mimic neurons of the human brain. The first generation of artificial intelligence was rules-based and used classical logic to draw reasoned conclusions within a narrowly defined problem domain. It was well-suited to monitoring processes and improving efficiency; however, advanced artificial intelligence (AI) extends to interpretation and adaptation without human intervention or narrow definitions of a problem.

For example, advanced models for artificial intelligence can utilize neuromorphic computing elements to emulate natural neural networks that exist in human brains. For instance, a "neuron" can fire independently of the others, and doing so, it sends pulsed signals to other neurons in the network that directly change the electrical states of those neurons. By encoding information within the signals themselves and their timing, such networks may simulate natural learning processes by dynamically remapping the synapses between artificial neurons in response to stimuli.

An example neuromorphic processing architecture is described in published U.S. patent application number 2018/0267846, entitled Processing System with Interspersed Processors with Multi-Layer Interconnection, which is herein incorporated by reference. Other implementations of neuromorphic processing architectures are possible, and the present systems and methods are not limited to the use of any particular form of neuromorphic processing architecture.

In examples, the presently disclosed systems and methods take advantage of neuromorphic computing to perform a variety of networking functions, such as defining how the network functions, defining how devices in the network are identified, and allowing the network to dynamically create network elements as they are required/desired and to destroy them when no longer needed. As a nonexclusive example, a node within the polymorphic network may determine that it needs an Ethernet port for execution of a certain task. The node, through neuromorphic computing, can add the Ethernet port to the node until the task is done, immediately destroy the Ethernet port, and then re-create it when needed again. For example, the neuromorphic processor may maintain a library of templates that allow it to quickly create and take down often-used functions required by that node.

In aspects of the present technology, all network interfaces of a network—terrestrial and wireless—may utilize a neuromorphic processor for isolation, performance, and scalability. Field programmable gate arrays can also be used. In aspects, such a network will support edge application monitoring to enable automated network and security reconfiguration. In some examples, traffic (e.g., packets) traversing a network can be classified as follows:

Generic Traffic Classification approach
  1. Identify traffic with moderate confidence
  2. Identify traffic to ignore or forward without analysis—example: network-layer distributed denial of service (DDOS) attack (ignore), Bot management code (forward), etc.
     Sufficient confidence—output—
        Transmit, Secure, Recode, Etc.
     Insufficient confidence—send to next step
  3. Finer grain classification as required
     Specific applications
     Higher priority or higher security
     Balance of accuracy and timeliness
     Output—
        Transmit, Secure, Recode, Etc.

In examples, the presently disclosed polymorphic network may employ the following specific polymorphic traffic classifications:

Polymorphic Hierarchical Traffic Assessment and Classification
  Polymorphic Macroflows—Traffic is represented collectively as continuum packet flows, whose evolution over networks is governed through macroscopic variables. in/out flows, capacities, and densities etc.
  Polymorphic Mesoflows—Traffic is also represented by application, like in the microflow case, but its movements are determined by discrete or combined macroflow rules.
     Port flows, DHCP flows, etc.
  Polymorphic Microflows—Traffic is also represented individual packets and move according to packet logic and routing rules, which may be stochastic and behavior-specific.
     Security traffic vs. browser traffic vs. alarm traffic vs. internet of things (IOT) traffic, etc. may all be represented as separate microflows and be subject to particular packet logic and routing rules.
  Polymorphic Security flows
     The network elements may examine packets and assign common ones to a port or in-line cache, one of which may be created for every data type. Packets being examined may then be compared with packets that are already in the cache to determine if they are suspect.
     Utilize a just-in-time compiler and/or encryption system to send the traffic to the next location. This is described in more detail below.
     The network may also "shape shift" to handle security measures. Using the above Polymorphic Flows to discover the attack, the network may identify traffic that is suspect in the network and apply an appropriate security measure based on the sensitivity of the data.
        The network can isolate the attacker's traffic—"shape shift"—by emulating the Polymorphic Node the traffic is attempting to reach and respond as if the traffic reached the requested node and notify the network management solution of the attack.
        The network can also store the traffic or discard the traffic and notify the network management solution of the attack.
        The network can also isolate the attacker's traffic and send the suspect traffic to an external security solution where the traffic can be further evaluated. The system might allow the traffic and continue to monitor/evaluate for further resolution.
        This technique utilizes colored graph theory to both identify the trustworthiness of the various network segments to which packets are being forwarded, as well as the trustworthiness of the various network participants (e.g. sender, receiver, relays).

Aspects of the presently disclosed edge-based polymorphic network solution may, in examples, be based on the following system functions:

Polymorphic network devices realize all or part of a digital logic network and cause it to take actual operating form without building it permanently.

Polymorphic input/output design contains primitives representing combinational logic, storage, devices, and other connections for primitive input and output pins/devices.

Polymorphic configuration utilizes polymorphic coding logic or neuromorphic processor logic and/or interconnect functions arranged in a manner determined by the input as well as associated downstream functions/configurations.

Polymorphic conversion turns polymorphic configuration/representation into a data file that is used to realize a design in the operating system. That is non-permanent code and can be implemented to create and destroy services on a node as needed.

Polymorphic operation causes hardware/software that is correctly configured to operate or execute its function.

Polymorphic interconnections are a reconfigurable mechanism for passing signals between a large number of I/O pins as if the pins were connected via wires.

All of these functions can, in examples, create and destroy blocks of circuitry as they operate to improve performance of commonly used, time-critical functions. While code is being interpreted/categorized, a hardware configuration may be formed to execute against.

In networking, nodes may be defined as devices that can send, receive, store, process, forward, or otherwise manipulate traffic (such as packets). Links may be defined to connect nodes and may be either wireless or wired. In aspects, the presently disclosed network interfaces have at least two characteristics. First, links and nodes may, in examples, be decomposed and communicate only with adjacent resources (Processing Element, Data Memory Router, Communications Fabric, IO, Polymorphic Function[1]). The operations of each link/node may be encapsulated and independent of others. However, various node and link models may work together in a network as long as they work for the resource. Second, all nodes may be processed simultaneously in each time step because they affect only the adjacent link boundaries. This characteristic may apply to link models as well; however, in aspects, a link may not be processed until its boundaries are updated by adjacent nodes.

[1] The following are examples of neuromorphic processor/network elements: A processing element (PE) is an advanced processing core capable of performing multiple operations per single cycle. A data memory router (DMR) element may comprise a memory network node coupled across 4—neighboring PEs—i.e. a routing fabric element. Routing fabric elements may enable communication and data exchange between PEs—one-to-one, one-to-many, many-to-one, and many-to-many. I/O elements may be based on need and can be configured to feed directly to the routing fabric element. They usually include DDR, SSI, CSI, LVDS, Ethernet, and other common I/O types.

A common feature of nearly all logic and memory devices is that they make use of stable units to represent 0's or 1's. The presently disclosed polymorphic configuration methods, however, may enable an unlimited number of network elements arranged in a fixed or logical configuration using quantum methods.

For example, a first method may comprise dynamically reconfiguring network elements into multiple configurations using "p-bits" or probabilistic computing. The p-bits are based on multi-terminal stochastic units where the output is continuously fluctuating between 0 and 1 based on a tunable mean. The p-bits can be stored and processed using neuromorphic processors or existing complementary metal-oxide-semiconductor (CMOS) technologies based on the spin-Hall effect. The p-bits can emulate certain properties of q-bits while still being implemented on currently available hardware. The p-bits can be interconnected to receive weighted contributions from other network elements in a network, and these weighted contributions can be chosen to not only solve problems of optimization and inference but also to implement precise Boolean functions in an inverted mode. The presently disclosed systems may use a network of p-bits that can approach the functionality of a network using quantum technologies.

A second, presently disclosed method may add a third bit state and manipulate the polarity of the input circuits (0,1,?) where ? indicates not needed or unknown. Earlier processor technology uses 0 and 1 for polarity. The use of quantum or near-quantum technology can introduce other polarity states such as ? for unknown or not needed. One could also expand the polarity through a fixed set of states such as 2, 4, 6, or other indicators that could emulate an expanded binary state.

Both methods may provide inputs consistent to a given output along with unique outputs to a given set of inputs supporting both Boolean and non-Boolean computations. Both methods can be used exclusively or in combination in support of massive parallel processing. Applicant has discovered that both methods are effective hardware accelerators.

In aspects, the network nodes implement a neuromorphic processor that has a "hardware caching" mechanism for optimization of configurations similar to a compiler, thus allowing for high levels of parallelism. In examples, this parallelism is dynamic and not fixed beforehand. It may be determined by the needs of the polymorphic configuration. For example, a presently disclosed system may reconfigure network architecture based on machine state and/or known control functions or sequences. In examples, presently disclosed systems may dynamically configure network architecture upstream and downstream as well as load a standard node and link model based on polymorphic network traffic analysis. For example, link and node templates may be dynamically loaded, used, and destroyed as necessary based on traffic analysis.

Consequently, parallel computing may be applied to enhance the computational performance as needed. Parallel computing is a type of computation where many calculations or the execution of processes are carried out simultaneously. There are several different forms of parallel computing: bit-level, instruction-level, data, and task parallelism.

Task parallelisms is a characteristic of a parallel program in which entirely different calculations may be performed on either the same or different sets of data. Task parallelism, in examples, involves the decomposition of a task into sub-tasks and then allocating each sub-task to a processor element for execution. The processors then execute these sub-tasks concurrently and often cooperatively. Task parallelism may also be dynamic and not fixed beforehand. It may be determined by the needs of the polymorphic configuration, maximize the use of available resources, and minimize fragmentation.

Figure 1:
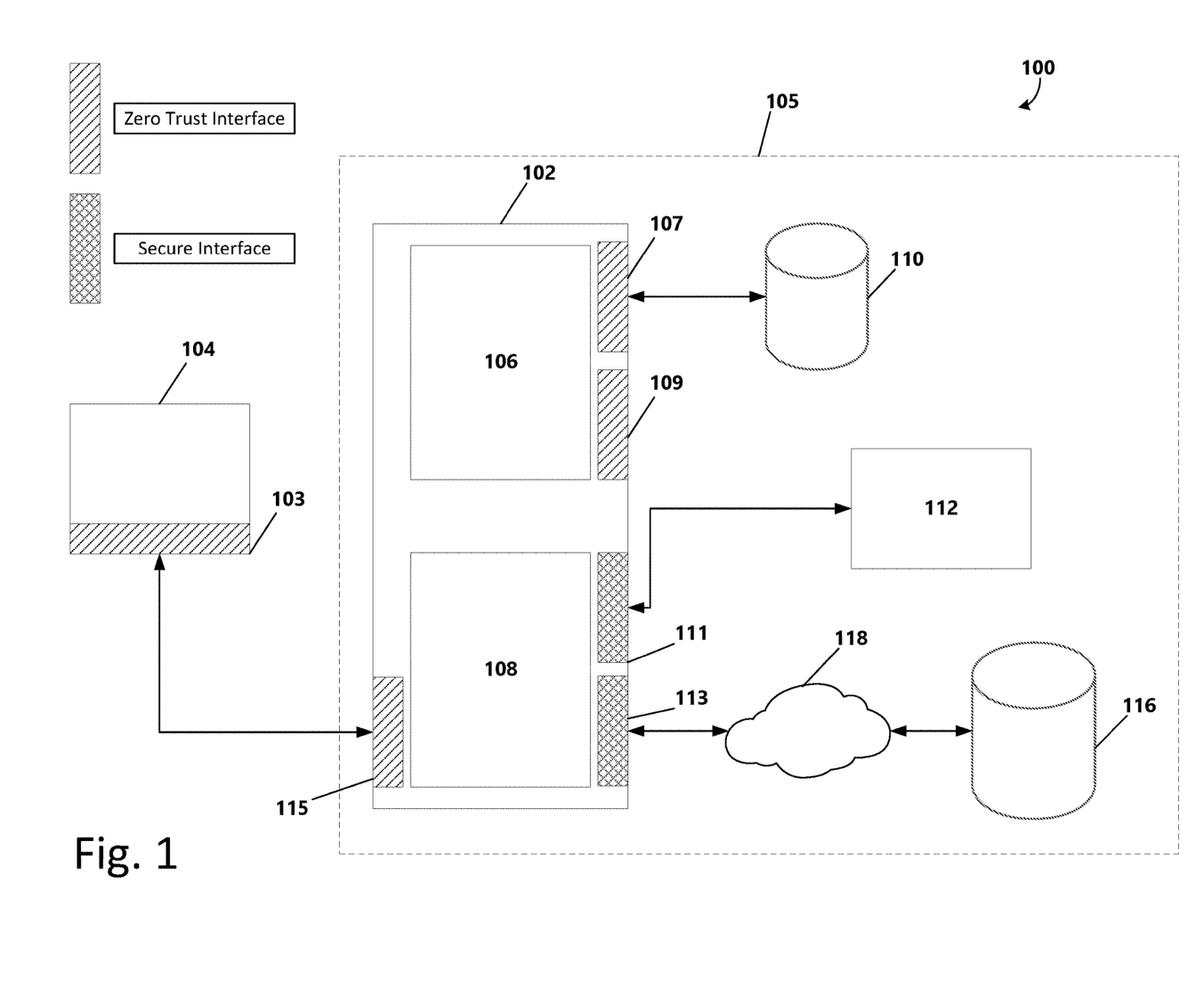
FIG. 1 is a block diagram of an example system according to aspects of the present application.

An example use of presently described polymorphic networking used in conjunction with automated machine learning is described in relation to the system 100 of FIG. 1. In the illustrated example, automated machine learning (AutoML) functions may be created and employed by a neuromorphic edge system 102. For example, a device 104, such as an Internet of Things (IOT) device, is connected to a provider network 105 through a neuromorphic edge system 102. The neuromorphic edge system 102, in examples, includes multiple neuromorphic processors, including at least a first neuromorphic processor 106 and a second neuromorphic processor 108. In examples, the neuromorphic processors 106 and 108 are operatively connected and may comprise processing elements, supporting memory, and interconnection elements similar to those described in U.S. Patent Application Publication Number 2018/0267846, which is incorporated by reference herein.

In examples, the device 104 may initiate operation and begin to report data to network 105 through a zero-trust interface 103 to neuromorphic edge system 102. For example, device 104 may comprise, in a nonexclusive example, a fracking platform pump sensor. The data packets are received at neuromorphic edge system 102 through a zero-trust interface 115.

In examples, a security function operating on the neuromorphic edge system 102 temporarily isolates the data packets from device 104 to a secure, local network cache, such as cache 110, which may be connected through one or more zero-trust interfaces 107 and 109. For example, the neuromorphic edge system 102 may inspect characteristics of the data packets in order to classify the packets based on historical knowledge of the network 105. Continuing this example, if the network 105 has seen this type of data before, it may classify the traffic and use artificial intelligence/machine learning (AI/ML) to inspect the data and predict that the data is being received from a fracking platform pump. The network 105 can execute on the new data set or notify the network administrator (e.g., through the depicted monitoring system 112), and the administrator may decide if this is data from a valid network device and instruct the system 102 to accept the data packets on the network 105. In examples, the monitoring system 112 may be operatively connected to neuromorphic edge system 102 through one or more secure interface 111, either directly or via one or more networks. In examples, when system 102 determines that the data from device 104 may be accepted (e.g., based on an automatic determination, an approval from an administrator, or some combination thereof), the data may be stored to data storage system 116, which may implement a network data lake. In examples, data storage system 116 may be operatively connected to neuromorphic edge system 102 through one or more secure interface 113 and one or more network 118.

In the above-described, nonexclusive example, an administrator using monitoring system 112 may confirm that device 104 is a fracking platform pump and name it "FrackingPump_201" based on previous fracking pump discoveries on the network 105. In other examples, it may be more advantageous to create an AutoML function at the neuromorphic edge system 102 and train it manually. This would allow the network administrator to define NORMAL, IMBALANCE, OFF, or a myriad of other states to identify. The software-defined AutoML function could then be placed in a polymorphism configuration listing (e.g., stored as part of, or accessible to, neuromorphic edge system 102) so it can be used anywhere in the network 105, when needed. For example, any polymorphic processor (such as polymorphic processors 106 and 108) in the network 105, can create a fracking pump data reporting function anywhere on the network 105, when data of that type is recognized (which can be referred to as an object-oriented network node). The AutoML function can then be destroyed by the polymorphic processor(s) 106 and/or 108 upon the detection of a trigger (e.g., expiration of a period of nonuse of the function) so that processor resources can then be used for other functions.

For example, the neuromorphic edge system 102 may inspect the data coming in on interface 115 and automatically recognize it is coming from a device 104 with an accelerometer and a gyroscope. The neuromorphic edge system 102 is then adapted to recognize that the device 104 is likely a sensor on a motor (e.g., based on comparison with historical data in a knowledge instantiation or data construct available to the neuromorphic edge system 102, such as local cache 110 or data storage system 116). In this example, either through AI/ML training and/or confirmation by the network administrator, the network recognizes this as an Internet of Things (IOT) sensor that requires machine learning (ML) to make use of the data. As such, the neuromorphic edge system 102 automatically creates a new network configuration—e.g., creates the network device: Device.FrackingPump_201( ).

The network 105 may use polymorphism to autonomously create the object-oriented Machine Learning (ML) asset and load this node model at the neuromorphic edge system 102 (e.g., from data storage system 116 or elsewhere) for use by the network device—e.g., child object: IOT.FrackingPump_201( ). The node model, in examples, includes the IOT data functions, ML/AI functions, and the appropriate link model to the alarming system—e.g., Child Object LINK.FrackingPump_201( ). The network 105 may also use an existing polymorphism configuration based on known device or control functions/sequences. For example, the existing polymorphism configuration for fracking pumps may be stored on the network 105 and retrieved when needed—e.g., FrackingPump( ).

The network 105 may also query the packets received from device 104 to see if a deep edge device, such as an advanced RISC Machine (ARM) based processor is found at the device 104. The network 105 will review available network assets and may determine it is best to push the new ML node model to the ARM processor at device 104 rather than manage as an edge asset on the neuromorphic edge system 102.

The neuromorphic edge system 102 then tests and trains the new network device AutoML code (for example, trains for 200 seconds) and selects the best algorithm based on the training results for, e.g.: logistic regression, gradient boosting machine, random forest, artificial neural network (ANN), or convolutional neural network (CNN). In this example, the network assumption is that the current state of the device 104 is "what NORMAL looks like" so any substantial deviation (e.g., above a threshold) in the data would cause an alarm to be generated for device 104. The network 105 then creates a route—LINK Model—to the data lake (e.g., at storage system 116) and creates a data pool at storage system 116—STORAGE Model—for the network device—e.g., Child Objects LINK.IOT.FrackingPump_201( )/DATA.IOT.FrackingPump_201( )—or assigns the new network device to an existing data lake at storage system 116— PUMPS.IOT.FrackingPump_201( )—with similar information based on the machine state of the device or known control function/sequence. In examples, neuromorphic edge system 102 also transfers to the data lake/pool at storage system 116 the data from local cache 110 that it started storing when the data packets first started arriving from device 104, and neuromorphic edge system 102 releases the data cache at local cache 110.

In this example, the device 104 (e.g., a fracking pump) now operates as a node on the network 105 and any software required for that node can be quickly instantiated when needed and destroyed when no longer needed. In examples, this is an automated process using code-less techniques. That is, it uses data parallelism, task parallelism, or a hybrid of both. Among other things, this allows the neuromorphic edge system 102 to operate as multiple node types on demand (fracking pump, Ethernet switch, encryption device, etc.). A single neuromorphic processor (e.g., 106, 108) can effectively run multiple devices simultaneously and on demand, as needed.

As another example, a neuromorphic processor (e.g., 106, 108) may be operating a software-defined 5G radio solution. However, it may recognize that it has started receiving long-term evolution (LTE) traffic from device 104. The processor 102 may determine that an LTE processing node may be logically close and start forwarding traffic to that node. However, if the LTE processing node is more than a threshold latency away, the neuromorphic processor 102 may simply create the LTE processing node on its own hardware by loading the appropriate node model for the LTE processing node and start processing the LTE traffic itself. The circuitry for the LTE processing function can then be destroyed by the neuromorphic processor (106, 108) when no longer needed (e.g., after expiration of a period of nonuse).

Figure 2:
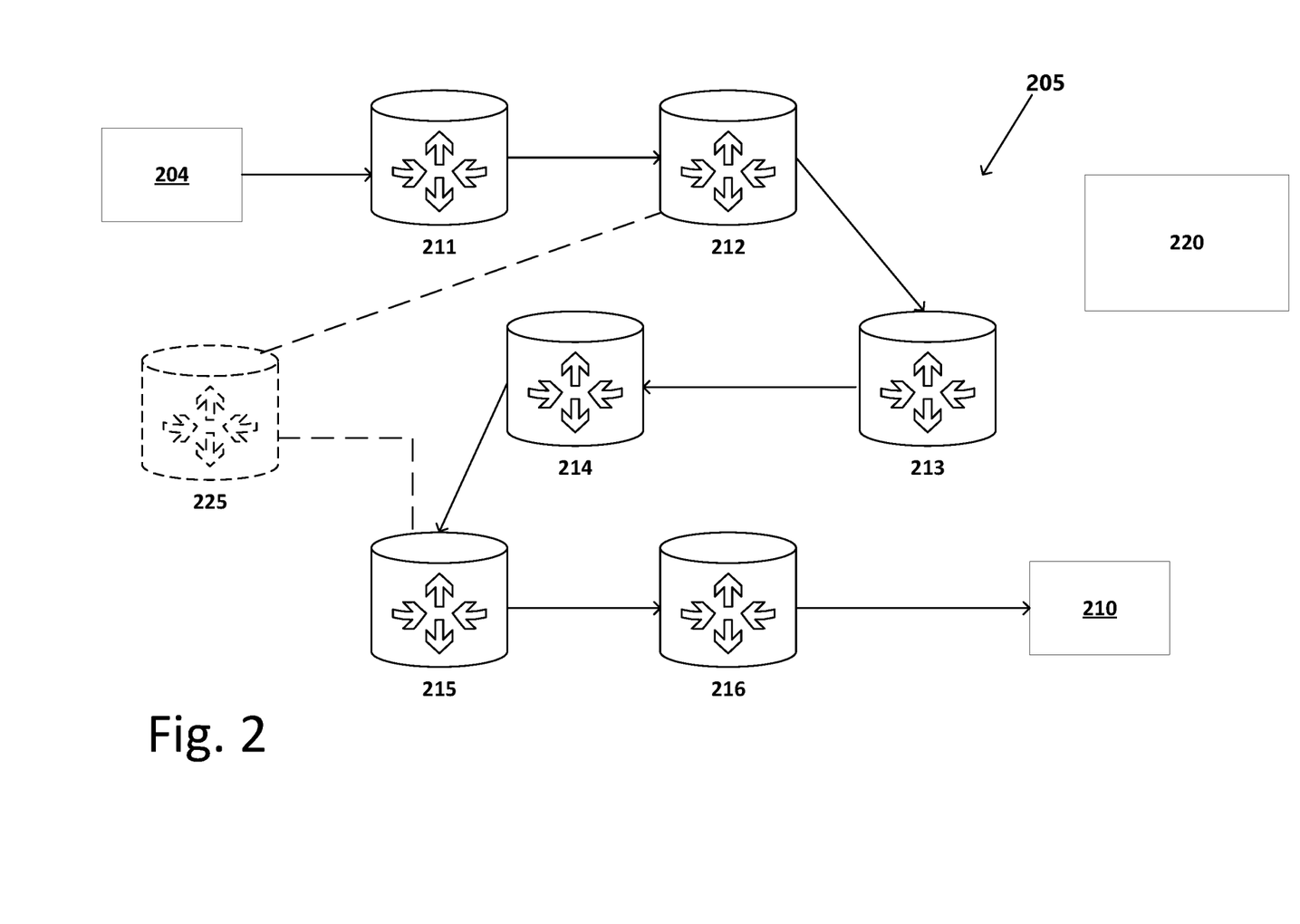
FIG. 2 is a block diagram of another example system according to aspects of the present application.

With reference to the example network 205 in FIG. 2, present systems and methods may also be useful from a network security perspective. In examples, there may be at least two desired behavioral aspects to polymorphic network security—proactive polymorphic data protection and neuromorphic network defense. In examples, both may couple machine learning with statistical analysis modeling technique known as colored graph theory (particularly path coloring) to protect data in an environment with various levels of trust. The presently disclosed systems and methods may use colored graph theory to determine the statistical trustworthiness of a segment (whether within a network, such as network 205, or within a connected network) from a network routing perspective. In some examples, this may eliminate a need for protocols such as IEEEP802.1.p to prioritize traffic.

Presently disclosed systems and methods may use this technique for data in motion, data in storage, and data being processed. The present systems and methods may employ various attributes—that may be represented statistically by colors—to describe underlying network characteristics and objectives—a primary being trustworthiness, with secondary and tertiary attributes that may include capacity (e.g., bandwidth availability), latency, and error rate. All of this may be part of a network data protection approach—choosing an optimal path by taking into account security, performance, etc. The solution may use path coloring to differentiate the riskiness of various network segments/paths and use this to drive network control plane decisions. By mimicking neuro-biological architectures from the human nervous system, the network 205 may be able to change behavior faster in response to a threat than it can respond using traditional network defense technologies. In examples, the network participants automatically adapt the level of security to achieve the appropriate level of security (e.g., no swapping key strengths, reprogramming equipment, etc.). The approach may use a co-processing node utilizing colored graph theory to manage both attackers and network topologies.

In examples, colored graph theory may be refined and implemented to measure and instrument a network's knowledge of different path segments and the riskiness and nature of each segment of a path based on network element attributes. This is effectively a multi-dimensional approach to the network control plane. This can be used to distinguish the level of risk associated with each segment (or hop) of a path in a network. This can also be considered with the shortest or fastest path. If the fastest path has one or more particularly risky segments, then (a) network protection or data protection mechanisms may be provided internal to the payload, or (b) if time allows, the network may find a different, safer path that would apply less bloat to the payload. In examples, the most-efficient path that still provides the requisite level of protection based on the sensitivity of the data may be used.

For example, and in particular reference to the network 205 of FIG. 2, for a particular path to be traversed by the traffic from a node 204 to a node 210, a graph is generated in the context of domains or subdomains describing all of the different routes. There is no one discrete path between node 204 and node 210. Instead, each path may be considered as a series of steps along the path (as a nonexclusive example, routers 211, 212, 213, 214, 215, and 216 and the communication links between them). Each segment/hop in colored graph theory may be assigned a set of coordinates, and that set of coordinates may be considered to have been assigned a color. In examples of the present colored graph theory approach, each color may be used to describe a risk nature, e.g.: Red=relatively confident that compromise would occur; Yellow=there are attributes that denote a higher probability of risk/exfiltration/exposure; Red/yellow=unknown attributes but known geographic location or high risk identified equipment; Green=all known, safe participants (e.g., the equipment of each hop/step have been vetted/worked with before).

In examples, one or more of nodes 204 and 210 and routers 211, 212, 213, 214, 215, and 216 may comprise a neuromorphic processing system, such as system 102 described with respect to FIG. 1. In addition, "nodes" may refer to an originating node (e.g., node 204) a terminating node (e.g., node 210) and/or one or more routers or other intermediate computing devices, such as routers 211, 212, 213, 214, 215, and 216.

Colored graph theory is thus a way to recognize/identify the paths mathematically. Decisions for the path may either be made on a (1) a hop-by-hop basis, or (2) fully mapped path-by-path basis. For example, a particular node (e.g, router 212) receiving packets may be aware only of the riskiness of its immediately neighboring nodes (routers 211 and 213) and links because it may receive advertised characteristics only about such neighboring nodes (as opposed to the entire network path to the destination). For example, when using border gateway protocol (BGP) or open shortest path first (OSPF), the segments in the path are not all known at the first hop. Rather, each router 211, 212, 213, 214, 215, and 216 determines the number of hops each path would take to get to node 210, but that path could change (such as during an attack when some equipment is overloaded or knocked offline). As such, each of the routers 211, 212, 213, 214, 215, and 216 along the way may need to make an independent risk decision. By contrast, a virtual private network (VPN) has a known path with known segments along the path, and in a multi-protocol label switching (MPLS) circuit, every segment in path is known. As such, a full-path risk assessment may be made.

In a BGP scenario, routers 211, 212, 213, 214, 215, and 216 can exchange routing and reachability information across two dissimilar or non-related systems, then negotiate and pull route information, and make risk assessment about each other. In examples, the normal protocol information that is exchanged can be extended to include information needed to make a risk assessment (e.g., device manufacturer information, geolocation, etc.). In other examples, each of routers 211, 212, 213, 214, 215, and 216 may have access to a blocklist of other devices that are known by the network 205 to be high risk. Information may be gathered similarly to a DNS lookup, where the network 205 itself has a knowledge instantiation (such as a key value store/data construct at storage device 220 that is operably connected to some or all of the nodes 204, 210 and routers 211, 212, 213, 214, 215, and 216).

As such, the present systems and methods may be flexible enough to make an aggregate risk assessment of risk for an entire path (when known), but also have enough knowledge to perform an assessment of the next hop along the path, when necessary. This can be accomplished using a variety of processing equipment, including the use of neuromorphic processors (such as neuromorphic edge system 102 and/or neuromorphic processor(s) 106, 108) or field-programmable gate arrays (FPGAs) within routers, such as routers 211, 212, 213, 214, 215, and 216. In either instance, a control plane of such routers may be redefined for a multi-dimensional approach to security, leveraging the colored graph theory approach.

Typically, routers may comprise an application-specific integrated circuit (ASIC), where the logic is designed into the circuit, the logic gates are fixed, and the logic paths are hard-coded into the circuit design. By contrast, field-programmable gate arrays (FPGAs) are chips that are designed to be dynamically configured post-manufacturing and still programmable. In addition, as discussed, neuromorphic processors provide ultimate flexibility to reprogram router functions as needed.

In working with either FGPAs or neuromorphic processors, aspects of the present system may modify a network element's (such as a router's) conventional control plane to add a multi-dimensional ability to analyze, mathematically, attributes (such as location, manufacturer, etc.) that pose a risk, which can then be marked as a color for colored graph theory.

A current FGPA software project, called SatCat5, is addressing the needs of an industrial internet of things (IoT). Devices are able to be directly connected to an Ethernet plane. For example, a smart watch may be connectable to the Internet over Ethernet through BlueTooth. Traditionally, the smart watch does not use any kind of Ethernet protocol. Rather, it is a programmatic connection to a mobile device, which in turn bridges to Ethernet over WiFi or a cellular. There are very few IoT devices that natively communicate via Ethernet protocols. As such, an IoT gateway is normally needed. SatCat5, however, extends the Ethernet control planes to IoT field devices and allows such devices to plug directly into an FGPA or other processor and communicate via Ethernet protocols.

By modifying the control plane of the routers, routers can continuously monitor and evaluate risk based on a variety of attributes, such as geolocation, manufacturer, etc. Among other things, SatCat 5 provides sensor data enrichment, for example, to include data about devices. Extracting characteristics of the device, such as its manufacturer, type, and location from enriched data traversing the links (wired or wireless) between nodes allows for the effective use of color graph theory to intelligently route packets in a network, such as network 205. For example, each of the routers 211, 212, 213, 214, 215, and 216 may (e.g., through SatCat5) learn information about the characteristics of the other nodes on network 205 that such router can then use to make intelligent decisions about routing and security mechanisms to implement before forwarding packets along a particular path.

In addition, information about the level of protection that is appropriate for a packet payload can also be used by the multi-dimensional control plane of the routers 211, 212, 213, 214, 215, and 216 to make effective decisions on how and where to route packets on network 205. For example, a sensitivity flag can be set within the data packet indicating a level of sensitivity for the payload. Based on the level of sensitivity of the payload, the router may make different decisions about routing and/or whether to add additional security to the packet itself.

Stated differently, each node (e.g., routers 211, 212, 213, 214, 215, and 216) may: evaluate security needs of the payload, determine the risk of next hop (or full path), select a hop (or full path) that is secure enough for the payload—if one is not available (or is too expensive in terms of latency or otherwise), then dynamically add security to the payload. That is, if a payload sensitivity flag is high, then the router may either (1) pick a safer route, and/or (2) dynamically add security (e.g., encryption added only for the risky segment (s) to account for the security needs of the payload). In some examples, multiple levels of sensitivity may be defined as well as multiple levels of risk scores for hops/paths of the network. In examples, routers may be configured to require that the risk score for a chosen hop/path must be at least as good (or better) than what is required for the level of sensitivity for the packet. Otherwise, the router must, itself, provide a requisite level of security for the packet by encryption or other means.

For example, router 212 may receive a packet (e.g., from node 204 through router 211) with a payload that has been marked, flagged, or tagged as requiring a heightened security level. The router 212 may determine all the paths that are available to send the packet and determine that there are no fully secure (e.g., "green") paths available. Or it may determine that the only "green" path is so expensive (e.g., in terms of latency or otherwise) and that it is not a viable option. For example, the only "green" path available may require that the router 212 send the packet to a router or gateway 225 that is on a third-party network (outside of network 205) or that the router 225 is too distant from router 212 (and would introduce an unacceptable latency). As such, the router 212 may determine that it needs to provide an additional level of encryption to the payload for at least the next hop. In the example illustrated in FIG. 2, the "next hop" is router 213, but depending on conditions of the network 205 at the time the packet is received, the next hop may change.

Using the present systems and methods, a neuromorphic processor operating as one or more of the routers 211, 212, 213, 214, 215, and 216 may, when it recognizes that additional security is needed for the packet, program one or more processing element on the neuromorphic processor to create encryption function. For example, as described with respect to the neuromorphic processors 106 and 108, the neuromorphic processor on the router(s) 211, 212, 213, 214, 215, and 216 may load an encryption node model available on a network data store upon determining that the additional payload security is needed. This may be done on the fly for as long as necessary to provide the additional payload security, and then the neuromorphic processor may destroy the encryption circuitry when no longer needed. As such, not all routers 211, 212, 213, 214, 215, and 216 in the network need to have encryption capability all the time—it can be created, used, and destroyed as needed.

Encryption on the router(s) 211, 212, 213, 214, 215, and 216 may include negotiation/handshaking/key exchange necessary for the payload to be encrypted from each router to the final destination (such that only the final destination and not any intervening routers can decrypt the payload). In examples, however, the encryption is done only as necessary to avoid packet bloat wherever possible.

As an example, where a packet is received from node 204 at router 211 and one defined route within network 205 is to traverse routers 212, 213, 214, 215, and 216 to reach its final destination (e.g., node 210), and router 213 is known to be compromised (e.g., it is made by a suspect manufacturer or is located in a suspect geographic location), then the hops between routers 212 and 213 and between routers 213 and 214 may be considered high risk. As such, router 211 may route the packet to router 212 without additional encryption (and to not add unnecessary packet bloat). In fact, depending on the network architecture and networking protocols being used, router 211 may not have the necessary information to determine whether router 213 is suspect. However, router 212, which receives device information from its neighboring router 213, may determine that router 213 is suspect. Router 212 then may negotiate a key exchange with router 214. This allows router 212 to wrapper the payload with the requisite level of encryption such that router 213 will be unable to access the payload when it is passed through that node. Router 214, in this example, may then decrypt the payload and (if the hop between routers 214 and 215 is determined by router 214 to be green) send it on to router 215 without encryption, so as to again eliminate any unnecessary bloat. Further, router 212 may intelligently determine that encryption is needed only as far as router 214 (rather than to the packet's ultimate destination) so as to eliminate unnecessary overhead with sending encrypted payloads all the way to router 216, for example. As discussed, the encryption mechanism can be instantiated on the fly by a neuromorphic processor operating as, or comprising, router 212, and the encryption mechanism may be automatically destroyed on router 212 when no longer needed (e.g., after a designated period of non-use). This allows for dynamically instantiated, just-in-time, granularly leveled data protection.

Figure 3A:
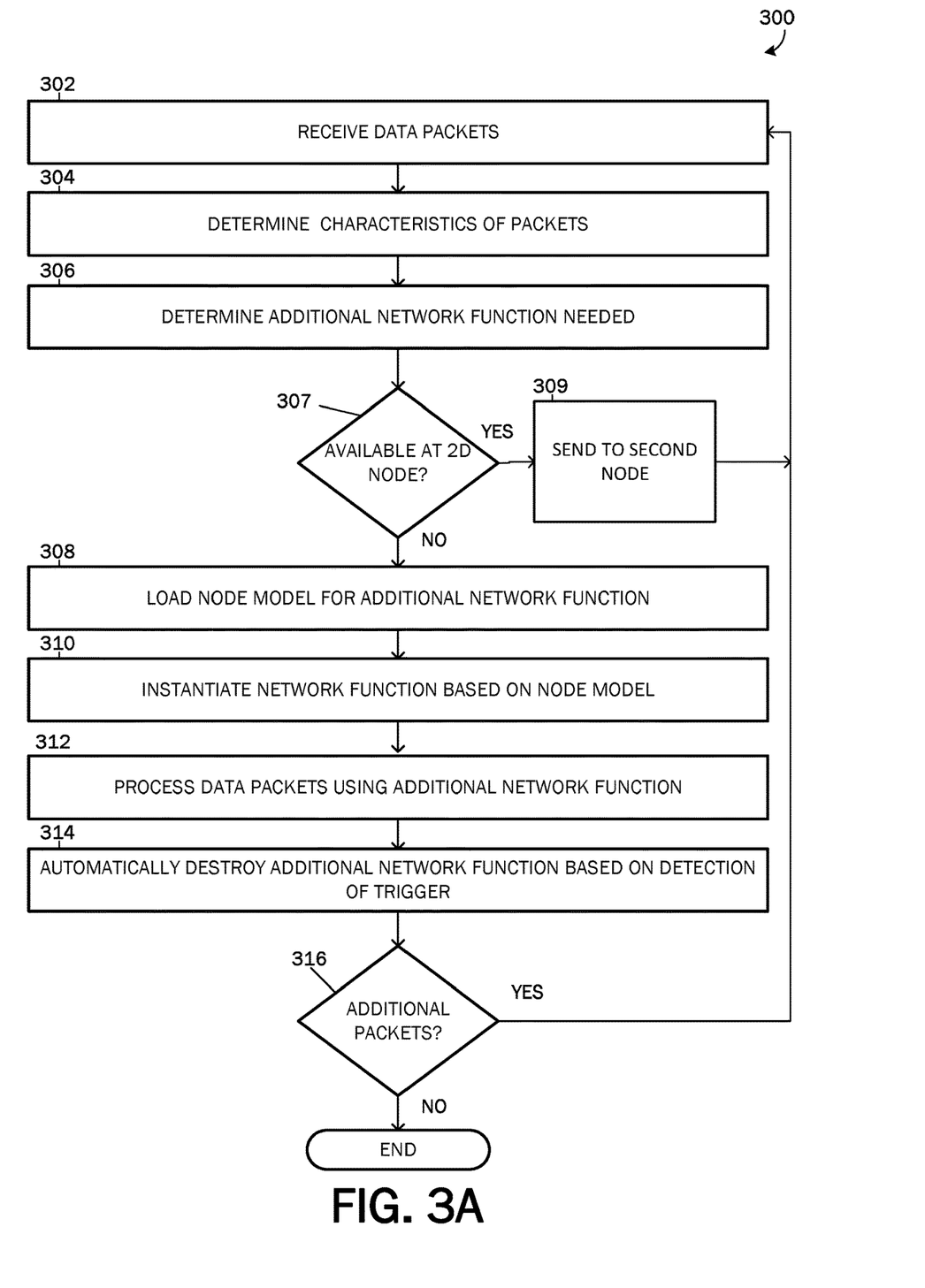
FIG. 3A is an example flow diagram of an example method according to the aspects of the present application.

Referring to FIG. 3A, an example method 300 is described. In some examples, method 300 may be performed by a system similar to the system 100 described with respect to FIG. 1. At operation 302, data packets are received. For example, neuromorphic edge system 102 operating as a first network node may receive data packets through a zero trust interface (e.g., interface 115).

At operation 304, characteristics of the data packets may be determined. For example, the neuromorphic edge system 102 may inspect characteristics of the data packets in order to classify the packets based on historical knowledge of the network 105. Continuing to operation 305, a determination is made that an additional network function is needed. For example, neuromorphic edge system 102 may determine whether it needs an additional network function in order to process the data packets that it has received. In some examples, a determination is made (at operation 307) whether the additional network function already exists at a second node. In some examples, operation 307 may also comprise determining whether the needed function already exists on a second network node that is available to the first network node at a sufficiently low network cost (e.g., latency) to justify sending the packets to the second node for processing (rather than instantiating the additional network function at the first network node). If so, the data packets are sent (operation 309) to the second network node, and flow proceeds back to operation 302. If not, flow proceeds to operation 308.

At operation 308, a node model for the additional network function is loaded. For example, the neuromorphic edge system 102 may load a node template for a function that is the same or similar to the needed additional network function from local or network storage. At operation 310, the additional network function is instantiated based on the node model. For example, the node model retrieved by the neuromorphic edge system 102 may be used to instantiate the additional network function. In some examples, operation 310 may include customizing the node model to instantiate the desired additional network function. To the extent the node model is customized for the additional network function, it may be stored as a new model available to other nodes on the network for use in dynamically instantiating the additional network function for such other nodes. In nonexclusive, nonlimiting examples, the additional network function may comprise (as described with respect to FIG. 1) a reporting function for a fracking pump, an encryption function for a router (as described with respect to FIG. 2) or a variety of other network functions that can be instantiated as needed).

At operation 312, the data packets are processed using the additional network function. For example, data packets from a fracking pump (e.g., in relation to the example described with respect to FIG. 1) might be stored to a network data lake. This is described further in relation to FIG. 3B. As another example, the data packets might be encrypted using a dynamically instantiated encryption function (as described with respect to FIG. 2).

At operation 314, the additional network function is automatically destroyed upon detection of a trigger. For example, neuromorphic edge system 102 may destroy the circuitry required for the additional network function upon expiration of a nonuse timer so that the processing elements of neuromorphic edge system 102 can be repurposed for other uses.

At operation 316 it is determined whether additional packets are available. If so, flow loops back to operation 302. If not, method 300 ends.

Figure 3B:
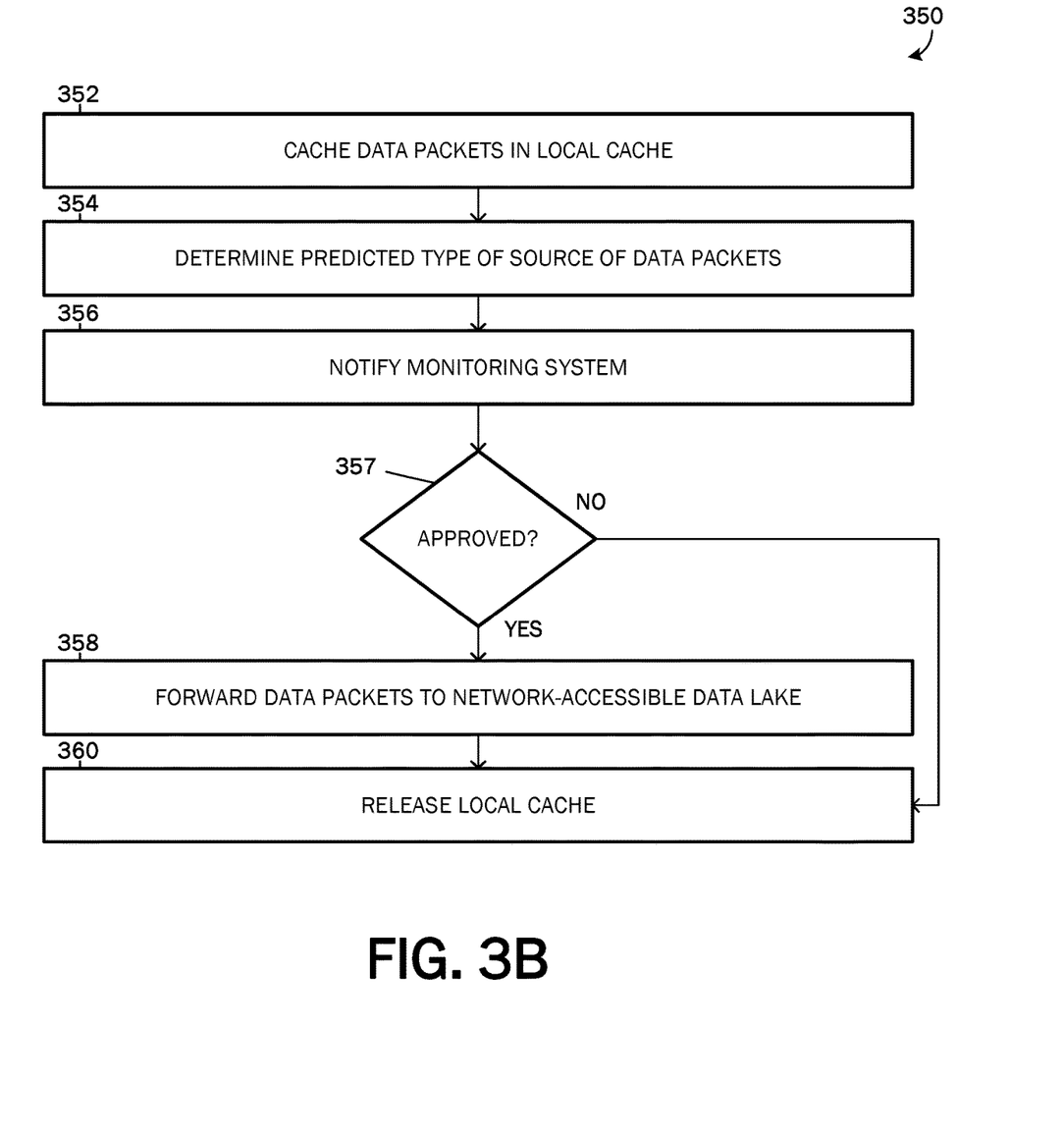
FIG. 3B is an example flow diagram of another example method according to the aspects of the present application.

FIG. 3B describes an additional method 350. In examples, method 350 includes operations that may be performed in conjunction with, or as part of, the operations of method 300. For example, in some examples, the data packets received at operation 302 may be stored (operation 352) in a local cache. In examples, this may be advisable if the source of the data packets is not known and the packets are received through a zero trust interface, such as interface 115. At operation 354, a predicted type of the source of the data packets may be determined. For example, the network 105 may predict, e.g., based on historical information, that the packets are likely from a particular source type, e.g., a fracking pump. In examples, such prediction may be made based on an AutoML function operating at neuromorphic edge system 102.

In some examples, flow proceeds to operation 356, where a monitoring system is notified. In some examples, the monitoring system (e.g., monitoring system 112) may comprise an administrator computing system. The notification may comprise information about the data packets as well as available information about the source of the information (e.g., device 104). In examples, flow proceeds to operation 357, where a determination is made whether the packets are approved for storage on the network. In some examples, the administrator may approve acceptance of the data packets (either with the predicted source type or with an amended source type), and flow proceeds "yes" to operation 358. At operation 358, the data packets are forwarded from the local cache to a network-accessible data lake, such as at data storage system 116, and flow proceeds to operation 360, where the local cache of the data packets is released. In other examples, an administrator may reject the data packets at operation 357, and flow proceeds "no" to operation 360, where the local cache of the data packets is released.

Figure 4:
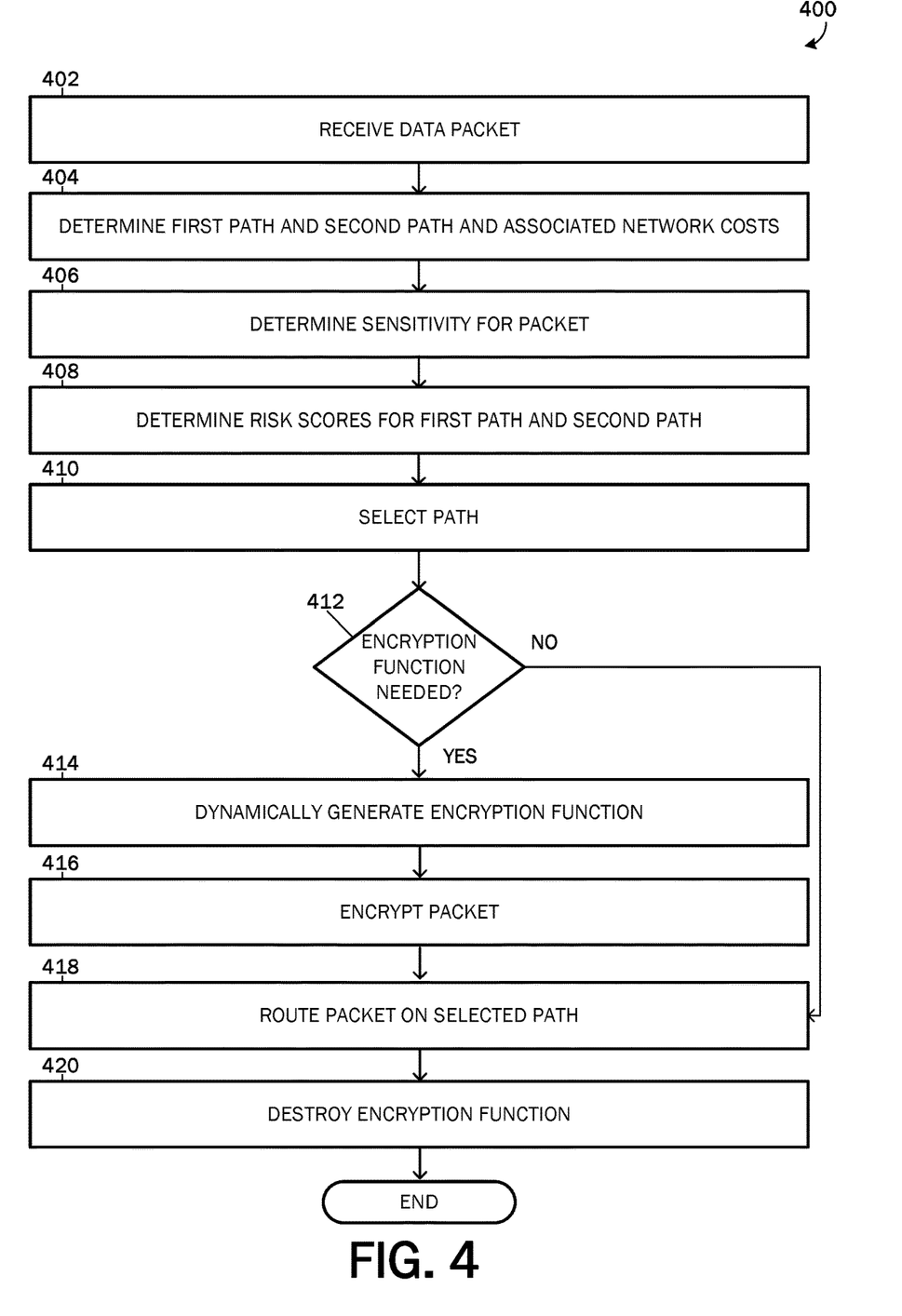
FIG. 4 is an example flow diagram of another example method according to the aspects of the present application.

FIG. 4 depicts another example method 400 for providing an on-demand network security function. Flow begins at operation 402, where a data packet is received. For example, with reference to FIG. 2, router 212 may receive a data packet from originating node 204 through router 211. At operation 404, a determination is made of a first path and a second path for the received data packet, and for a network cost associated with each. In some examples, network cost may comprise latency associated with a path. For example, the router 212 may determine that a first available path may include router 213 and a second network path may include router 225.

At operation 406 a sensitivity for the data packet is determined. For example, router 212 may determine that the packet includes a payload that requires heightened security (e.g., a "high" security level). In examples, this may be determined by inspection of the packet header, flags, or otherwise. Router 212 may also be programmed to require, for all high-security level packets, that only "green" routes are used—that is routes that have a low risk score; otherwise, the router 212 is required to add sufficient security to the packet. At operation 408, a determination is made of risk scores associated with both of the first path and the second path. For example, the first path from router 212 may include a router 213 that is untrusted or is associated with characteristics that increase a risk score associated with router 213, such as a particular location of router 213, a particular manufacturer, characteristics about router 213 known to router 212 or available through a knowledge base 220, etc. By contrast, router 225 may be associated with a low risk score (and the second path, therefore, may be considered "green").

At operation 410 a path is selected. For example, router 212 may select a path from the first path and the second path based on a variety of factors, including the associated network costs (such as latency), the determined sensitivity of the data packet, the risk scores for the first path and the second path, etc. It should be understood that, although method 400 is discussed in terms of a single data packet, path selection and other determinations made in the operations of method 400 may be made heuristically based on statistics associated with multiple data packets, time-based trends, etc.

At operation 412, a determination is made whether an encryption function is needed. For example, if the first path is chosen (and the risk score for that path does not satisfy the requirements for the sensitivity level for that packet), then encryption may be needed. Continuing the above example, router 212 may decline to select the "green" path through router 225 due to network cost (e.g., latency). In that case, the router 212 may require an encryption function. If the router 212 does not then currently have an encryption function instantiated, such function needs to be instantiated at least temporarily to route the packet through router 213 to router 214 in order to satisfy requirements of the network with respect to the sensitivity of the packet.

From operation 412, if the encryption function is needed, flow branches "yes" to operation 414, where the encryption function is dynamically instantiated. For example, the router 212 may comprise a neuromorphic processing system (such as described with respect to FIG. 1) that can dynamically generate an encryption function as needed based on a node model. At operation 416, the packet is encrypted. As described, in examples, the encryption established by router 212 will encrypt the data packet in a tunnel through router 213 to router 214, where it will be unencrypted prior to being further routed (in order to eliminate unnecessary bloat). Flow proceeds from operation 416 (or branching "no" from operation 412) to operation 418, where the data packet is routed along its selected path. At operation 420, the encryption function may be destroyed (e.g., when no longer needed due to expiration of a nonuse timer), and the method 400 ends.

Figure 5:
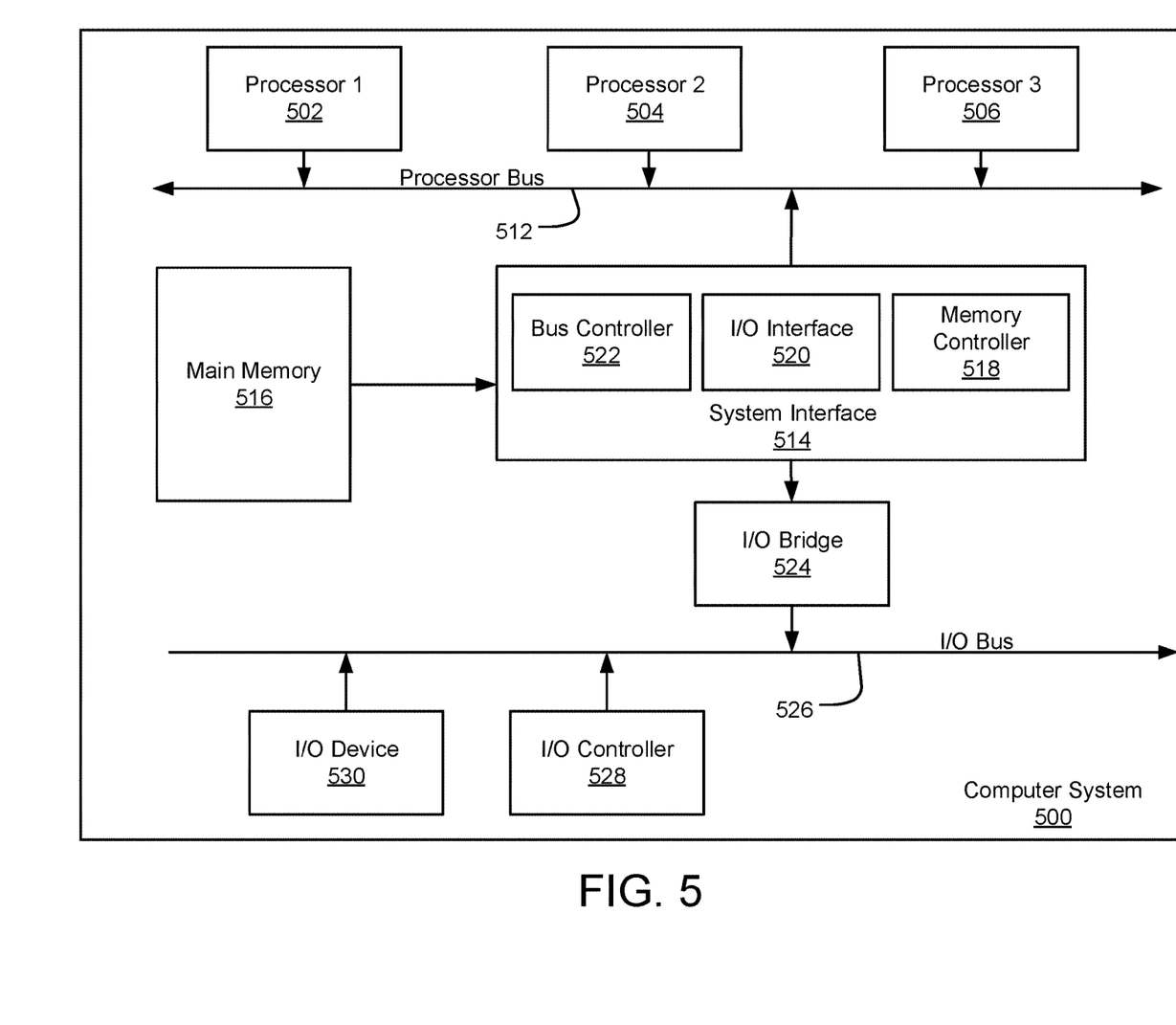
FIG. 5 is a block diagram of an example computing system with which one or more aspects of the disclosure may be implemented.

In examples, one or more processes discussed herein may be performed using an operating environment such as the one described in FIG. 5. FIG. 5 is a block diagram illustrating an example of a computing device or computer system 500 which may be used in implementing the examples of the components of the network disclosed above. The computer system (system) includes one or more processors 502-506. Processors 502-506 may include one or more internal levels of cache (not shown) and a bus controller or bus interface unit to direct interaction with the processor bus 512. Processors may be neuromorphic processors, FPGAs, or otherwise. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one example, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative examples, circuitry may be used in place of or in combination with the software instructions. Thus, examples of the present disclosure may include both hardware and software components.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, bare metal server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 516, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Examples of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

We claim:

1. A method for dynamically instantiating a network function on a network, comprising:
    receiving, at a first network node, data packets, wherein the first network node comprises a neuromorphic processor;
    determining, by the first network node, that the data packets include at least first and second characteristics;
    determining, based on the first and second characteristics that an additional network function is needed;
    determining, by the first network node, whether the additional network function is available on a second node, and, when the additional network function is available on the second network node, determining whether a network distance from the first network node to the second network node is greater than a threshold latency;

loading, by the neuromorphic processor, a node model for the additional network function;

instantiating the additional network function on the neuromorphic processor based on the node model, wherein instantiating the additional network function on the neuromorphic processor is based on determining that the network distance from the first network node to the second network node is greater than the threshold latency;

processing the data packets based using the additional network function; and automatically destroying the additional network function on the neuromorphic processor upon detection of a trigger.

2. The method of claim 1, wherein the trigger comprises expiration of a period of nonuse of the additional network function.

3. The method of claim 1, wherein the data packets are received from an unidentified source, further comprising:

determining a type of the source based on the first and second characteristics;

wherein determining that the additional network function is needed is based further on determining the type of the source.

4. The method of claim 3, further comprising:

caching the data packets in a cache until the type of source is determined; and based on determining the type of source, forwarding the data packets from the cache to a separate data lake available to other processing elements of the network.

5. The method of claim 4, wherein the data packets are received through a first zero trust interface at the first network node, the data packets are sent to the cache through a second zero trust interface, and the data packets are forwarded to the separate data lake through a secure interface.

6. The method of claim 4, further comprising:

sending a notification to a monitoring system; and receiving approval from the monitoring system prior to forwarding the data packets from the cache to the separate data lake.

7. The method of claim 1, wherein the data packets are received by the first network node from a source device, further comprising causing the node model for the additional network function to be installed at the source device.

8. The method of claim 1, further comprising:

after automatically destroying the additional network function on the neuromorphic processor, receiving, by the first network node, second data packets;

redetermining, by the first network node, whether the additional network function is available on the second node;

when the additional network function is available on the second network node, redetermining whether the network distance from the first network node to the second network node is greater than the threshold latency; and when the network distance from the first network node to the second network node is not greater than the threshold latency, forwarding, by the first network node, the second data packets to the second network node.

9. A system for dynamically instantiating a network function on a network, comprising:

a first network node that includes:

a neuromorphic processor;

memory, operatively connected to the neuromorphic processor and containing instructions that, when executed by the neuromorphic processor, cause the first network node to perform a method, wherein the method comprises:

receiving, at a first network node, data packets, wherein the first network node comprises a neuromorphic processor;

determining, by the first network node, that the data packets include at least first and second characteristics;

determining, based on the first and second characteristics that an additional network function is needed;

determining whether the additional network function is available on a second node, and, when the additional network function is available on the second network node, determining whether a network distance from the first network node to the second network node is greater than a threshold latency;

loading, by the neuromorphic processor, a node model for the additional network function;

instantiating the additional network function on the neuromorphic processor based on the node model, wherein instantiating the additional network function on the neuromorphic processor is based on determining that the network distance from the first network node to the second network node is greater than the threshold latency;

processing the data packets based using the additional network function; and automatically destroying the additional network function on the neuromorphic processor upon detection of a trigger.

10. The system of claim 9, wherein the trigger comprises expiration of a period of nonuse of the additional network function.

11. The system of claim 9, wherein the data packets are received from an unidentified source, the method further comprising:

determining a type of the source based on the first and second characteristics;

wherein determining that the additional network function is needed is based further on determining the type of the source.

12. The system of claim 11, wherein the method further comprises:

caching the data packets in a cache until the type of source is determined; and based on determining the type of source, forwarding the data packets from the cache to a separate data lake available to other processing elements of the network.

* * * * *